United States Patent [19]

Ishida

[11] Patent Number: 5,135,600

[45] Date of Patent: Aug. 4, 1992

[54] METHOD FOR PRODUCING VINYL CHLORIDE RESIN PRODUCTS

[75] Inventor: Noboru Ishida, Fujinomiya, Japan

[73] Assignee: Terumo Kabushiki Kaisha, Tokyo, Japan

[21] Appl. No.: 488,082

[22] PCT Filed: Nov. 18, 1988

[86] PCT No.: PCT/JP88/01170

§ 371 Date: Jul. 16, 1990

§ 102(e) Date: Jul. 16, 1990

[87] PCT Pub. No.: WO89/04851

PCT Pub. Date: Jun. 1, 1989

[30] Foreign Application Priority Data

Nov. 20, 1987 [JP] Japan .................. 62-292148

[51] Int. Cl.$^5$ .................................................. C09J 5/02
[52] U.S. Cl. .......................... 156/308.6; 128/DIG. 24; 156/326; 264/345; 428/520; 604/408
[58] Field of Search ............... 156/308.6, 326, 293; 264/345; 428/520; 604/408; 128/DIG. 24

[56] References Cited

U.S. PATENT DOCUMENTS

| | | | |
|---|---|---|---|
| 2,536,773 | 1/1951 | Saidel | 428/520 |
| 2,729,585 | 1/1956 | Gruber et al. | 428/520 |
| 3,073,736 | 1/1963 | Lange | 156/308.6 |
| 3,940,802 | 3/1976 | Sako et al. | 604/408 |
| 4,457,795 | 7/1984 | Mason et al. | 156/308.6 |
| 4,687,474 | 8/1987 | Takanashi | |

FOREIGN PATENT DOCUMENTS

| | | |
|---|---|---|
| 1228783 | 11/1966 | Fed. Rep. of Germany . |
| 1569548 | 5/1970 | Fed. Rep. of Germany . |
| 1719095 | 7/1971 | Fed. Rep. of Germany . |
| 2527453 | 12/1983 | France . |
| 48-10142 | 2/1973 | Japan . |
| 342683 | 1/1960 | Switzerland . |
| 787210 | 12/1957 | United Kingdom . |
| 1188955 | 4/1970 | United Kingdom . |

Primary Examiner—John J. Gallagher
Attorney, Agent, or Firm—Frishauf, Holtz, Goodman & Woodward

[57] ABSTRACT

A method for making a medical instrument from vinyl chloride resin. The method comprises forming two vinyl chloride members and adhering the vinyl chloride resin members together. The adhering of the vinyl chloride members together comprises applying to one or both surfaces of portions of the vinyl chloride resin members to be adhered together a liquid lubricant, which is compatible with vinyl chloride resin and which dissolves vinyl chloride resins and then joining the portions to be adhered together in close adhesion with each other. This method produces vinyl chloride resin medical instruments in a safer fashion than those produced by using an organic solvent.

9 Claims, No Drawings

METHOD FOR PRODUCING VINYL CHLORIDE RESIN PRODUCTS

BACKGROUND OF THE INVENTION

1. Field of the Invention

This invention relates to a method for producing vinyl chloride resin products which involves sticking vinyl chloride resin members together.

2. Description of the Background Art

Vinyl chloride resin members have conventionally been joined together either by high-frequency fusion welding or with an organic solvent. However, a high-frequency generator and a metallic mold are necessary for high-frequency fusion welding. There is a restriction to the shapes of the portions to be welded together of both members to be joined together because the metallic mold should have such a structure that it covers and presses the portions. Moreover, it is difficult to perform stable and homogeneous high-frequency fusion welding of vinyl chloride resin members because its conditions including high-frequency oscillation and tuning should be adjusted according to the shapes of the portions to be welded together of the members.

When it was impossible to join vinyl chloride resin members together by high-frequency fusion welding because of their shapes or a similar reason, they were stuck together with an organic solvent. The method consists of forming the portions to be stuck together of vinyl chloride resin members into such shapes that the members become in close contact with each other. When the members are not in close contact with each other because of their shapes an auxiliary member is interposed between the members to make them in close contact with each other and then infiltrating an organic solvent into the portions which are in close contact with each other to make surfaces to be stuck together to be dissolved by the organic solvent. For the organic solvent, those capable of dissolving vinyl chloride resins such as tetrahydrofuran (THF), cyclohexanone, ethyl acetate, acetone and methyl ethyl ketone (MEK) are used. In sticking vinyl chloride resin members together with an organic solvent, sufficient ventilation is necessary because of a problem of working environment which is a possibility that the organic solvent evaporates, fills the workroom and adversely affects workers. This leads to a high production installation cost. In addition, despite sufficient ventilation, workers' health conditions have to be periodically confirmed.

Moreover, use of an organic solvent can not avoid its remaining in vinyl chloride resin members. Since an organic solvent is liable to evaporate but has a high affinity for vinyl chloride resins, an excess of an organic solvent used in sticking vinyl chloride resin members together evaporates but not a small amount of the organic solvent dissolves the vinyl chloride resin and infiltrates into it remains in it. The organic solvent remaining in the vinyl chloride resin easily dissolves in an aqueous solution when the thus produced product touches it.

Particularly, when vinyl chloride resin products are those directly touching humor or drug solutions which include blood or solution administration sets, external circulation blood circuits such as dialyzers and pump-oxygenators and catheters, the residual organic solvent will dissolve in humor especially blood or an infusion drug solution thereby entering the patient's body. When vinyl chloride resin products are blood bags or infusion solution bags, as a blood preservation solution or an infusion drug solution contained in the bag touches the inner surface of the product for a long period from its production until its use, there is a high possibility that a residual part of the organic solvent used as an adhesive dissolves in the drug solution. As a result, the organic solvent will be present in the collected blood or the drug solution and when it is administered to a patient the organic solvent will enter the patient's body. As patients requiring blood transfusion or solution infusion usually have reduced physical strength in many cases, entrance of such an organic solvent into the patient's body is very dangerous.

Thus, the object of this invention is to provide a method for producing vinyl chloride resin products which are free from the problems of the method of joining vinyl chloride resin members together by high-frequency fusion welding and the problems of the method of sticking vinyl chloride resin members together with an organic solvent.

SUMMARY OF THE INVENTION

This invention is a method for producing vinyl chloride resin products which involves sticking vinyl chloride resin members together. The method comprises the process of applying a compounding agent for vinyl chloride resins compatible with them to the portion to be stuck of at least one of said vinyl chloride resin members and then making the portions to be stuck together of the two members in close adhesion with each other.

DESCRIPTION OF THE PREFERRED EMBODIMENTS

This invention is a method for producing vinyl chloride resin products which involves the process of sticking vinyl chloride resin members together. The method comprises the process of applying a compounding agent for vinyl chloride resins compatible with them to the portion to be stuck of at least one of the vinyl chloride resin members and the process of joining together the portions to be stuck together of the two members by pressure.

Any vinyl chloride resin product having stuck portions of vinyl chloride resin members can be a subject of the production method of this invention. Since no organic solvents are used in sticking vinyl chloride resin members together in this invention, it can be favorably used as a method for producing medical instruments made of vinyl chloride resins. Those medical instruments include bags such as blood bags, infusion solution bags and nutrition-promoting medicine bags, sets or tubes such as blood administration sets, solution administration sets, winged infusion sets, A-V fistula needle sets for artificial dialysis, connecting tubes and extension tubes, blood circuits including external circulation blood circuits such as blood circuits for dialysis and those for pump-oxygenators and blood circuits for plasma isolation or plasma collection, catheters such as intravenous hyperalimentation catheters, Nelaton catheters, suction catheters and feeding catheters and soft venous reservoirs used in artificial pump-oxygenator circuits.

In this invention, the process of sticking at least two members together includes the process of applying a compounding agent for vinyl chloride resins compatible with them to the portion to be stuck of at least one of the members and the process of making the portions to be stuck together of the two members to which the compounding agent has been applied in close adhesion with each other. This latter process can be achieved by joining the portions together by external pressure, fixing or fitting one of the members into the other member by force or a similar method.

The vinyl chloride resin used in this invention may contain compounding agents such as a plasticizer, a lubricant and an antioxidant in addition to a polyvinyl chloride.

The compounding agent for vinyl chloride resins which is used in this invention is compatible with vinyl chloride resins and dissolves them to some extent. It is generally mixed into a vinyl chloride resin to improve or adjust its nature and is usually used only for such a purpose. This invention was achieved by finding out an unpredictable fact that these compounding agents can also be used as an adhesive instead of being used for these purposes.

One being a liquid at ordinary temperature can most favorably be used as the compounding agent for vinyl chloride resins. In concrete terms, a liquid plasticizer for vinyl chloride resins, a liquid lubricant or a similar one is most suitable as the compounding agent used in this invention. The liquid plasticizer is di-(2-ethylhexyl) adipate, diisodecyl adipate, di-(2-ethylhexyl) azelate, dibutyl phthalate, di-(2-ethylhexyl) phthalate, di-n-octyl phthalate, di-n-heptyl phthalate, di-n-decyl phthalate, diisodecyl phthalate, tris-(2-ethylhexyl) trimellitate, triphenyl phosphate, tricresyl phosphate, epoxidized soybean oil, a polyester (medium molecular weight) or chlorinated paraffin (40% chlorination), preferably di-(2-ethylhexyl) phthalate or di-n-decyl phthalate.

For the liquid lubricant which may be either an internal one or an external one, hydrocarbons such as liquid paraffin, natural paraffin, polyethylene wax and hydrocarbon chlorides, fatty acids such as stearic acid, metallic soaps such as zinc stearate and barium stearate, fatty acid amides such as stearic acid amide, palmitic acid amide, methylenebis stearylamide and ethylenebis stearylamide and esters such as butyl stearate, cetyl palmitate and stearic acid monoglyceride can be used. Zinc stearate or liquid paraffin is the most suitable as the liquid lubricant.

In addition, a vinyl chloride compound, a gelling agent or a similar agent may be added to the compounding agent used in this invention.

The liquid compounding agent for vinyl chloride resins used in this invention, since it has affinity for vinyl chloride resins, compatible with them and somewhat dissolves them, is liable to penetrate into them. This means conversely that a vinyl chloride near the surface to which the liquid compounding agent for vinyl chloride resins has been applied is liable to dissolve in the liquid compounding agent. The surfaces of the portions in close adhesion with each other of vinyl chloride resin members are stuck together by being dissolved by the liquid compounding agent for vinyl chloride resins which is on the portions. The liquid compounding agent is successively absorbed inward by the vinyl chloride resin.

In the production method of this invention, firstly at least two members to be joined together are formed from vinyl chloride resins. The shapes of the members may be any ones such as sheets or tubes.

The process of sticking formed vinyl chloride resin members together comprises applying the above compounding agent for vinyl chloride resins to one or both of the surfaces to be stuck together of the members and then making the surfaces in close adhesion with each other preferably joining them together by pressure. When the vinyl chloride product is a medical instrument, the adhesive strength is further increased by heating vinyl chloride members to about 120° C. by autoclave sterilization performed after application of the compounding agent and making the members in close adhesion with each other. Autoclave sterilization which heats the members to about 120° C. for example results in firmer adhesion between the members.

Examples of this invention will be described in the following.

In the examples, adhesive strength was measured by an autograph manufactured by Shimadzu Corporation and tension speed was 100 mm/minute. Measurement results are expressed as kg and means and standard deviations are given.

EXAMPLES 1 AND 2, COMPARATIVE EXAMPLE 1

After each of the various adhesives shown in Table 1 was applied to a vinyl chloride resin tube (proportions: 100 parts of a polyvinyl chloride, 60 parts of DOP, 5 parts of epoxidized soybean oil and 5 parts of a Cu-Zn-system stabilizer), it was fixed into the hub of a blood-collecting needle made of a vinyl chloride resin (proportions: 100 parts of a polyvinyl chloride, 15 parts of DOP, 5 parts of epoxidized soybean oil and 5 parts of a Cu-Zn-system stabilizer). The adhesive was applied to a 2-4 mm length outer surface of the end of the vinyl chloride resin tube. The fixation length was about 3 mm. The adhesive strength between the two members was measured within 30 minutes after they were fixed and stuck together. After that, the resulting products were sterilized in an autoclave at about 118° C. for about 20 minutes. The adhesive strengths of each of the products before and after sterilization were as shown in Table 1.

TABLE 1

|  | Adhesive | Before sterilization | After sterilization |
|---|---|---|---|
| Example 1 | DOP | 7.6 ± 0.9 | 10.0 ± 1.9 |
| Example 2 | Liquid paraffin | 9.0 ± 0.5 | 17.1 ± 0.3 |
| Comparative example 1 | THF | 4.2 ± 1.1 | 11.4 ± 2.2 |

DOP, liquid paraffin and THF of 100% concentration were used.

EXAMPLES 3 AND 4, COMPARATIVE EXAMPLES 2 AND 3

A vinyl chloride resin tube (proportions: 100 parts of a polyvinyl chloride, 60 parts of DOP, 5 parts of epoxidized soybean oil and 5 parts of a Cu-Zn-system stabilizer) and a vinyl chloride resin tube (proportions: 100 parts of a polyvinyl chloride, 60 parts of DOP, 5 parts of epoxidized soybean oil and 5 parts of a Cu-Zn-system stabilizer) were fixed together after applying each of the various adhesives shown in Table 2 to the surface to be stuck. The adhesive was applied to a 2-4 mm length outer surface of the end of the thinner vinyl chloride resin tube to be inserted (about 4.4 mm outer diameter). The fixation length was 4-6 mm. The adhesive strength between the two members was measured within 30 minutes after they were fixed and stuck together. The resulting products were sterilized in an autoclave at about 118° C. for about 20 minutes. The adhesive strengths of each of the products before and after sterilization were as shown in Table 2.

TABLE 2

|  | Adhesive | Before sterilization | After sterilization |
|---|---|---|---|
| Example 3 | DOP | 2.51 ± 0.18 | 10.3 ± 0.4 |
| Example 4 | Liquid paraffin | 2.09 ± 0.21 | 10.1 ± 0.4 |
| Comparative example 2 | THF | 1.40 ± 0.10 | 10.2 ± 0.4 |
| Comparative example 3 | Paste resin | 2.30 ± 0.16 | 9.8 ± 0.3 |

DOP, liquid paraffin and THF of 100% concentration were used and the paste resin used was a mixture of a polyvinyl chloride and DOP.

EXAMPLES 5 AND 6, COMPARATIVE EXAMPLES 4, 5 AND 6

After each of the various adhesives shown in Table 3 was applied to a vinyl chloride resin tube (proportions: 100 parts of a polyvinyl chloride, 60 parts of DOP, 5 parts of epoxidized soybean oil and 5 parts of a Cu-Zn-system stabilizer), it was fixed into a Y-tube made of a vinyl chloride resin (proportions: 100 parts of a polyvinyl chloride, 40 parts of DOP, 5 parts of epoxidized soybean oil and 5 parts of a Cu-Zn-system stabilizer). The fixation length was 8.65 mm. The adhesive strength between the two members was measured within 30 minutes after they were fixed and stuck together. The adhesive was applied to a 2-4 mm length outer surface of the end of the vinyl chloride resin tube (4.4 mm outer diameter) to be inserted. No adhesives were applied to the end of the tube in Comparative example 6. After that, the resulting products were sterilized in an autoclave at about 118° C. for about 20 minutes. The adhesive strengths of each of the products before and after sterilization are as shown in Table 3.

TABLE 3

|  | Adhesive | Before sterilization | After sterilization |
|---|---|---|---|
| Example 5 | DOP | 0.43 ± 0.04 | 10.0 ± 0.4 |
| Example 6 | Liquid paraffin | 0.51 ± 0.05 | 10.2 ± 0.4 |
| Comparative example 4 | THF | 0.24 ± 0.04 | 10.1 ± 0.4 |
| Comparative example 5 | Paste resin | 0.40 ± 0.06 | 10.0 ± 0.4 |
| Comparative example 6 | — | 1.02 ± 0.23 | 5.95 ± 1.01 |

DOP, liquid paraffin and THF of 100% concentration were used and the paste resin used was a mixture of a polyvinyl chloride and DOP.

INDUSTRIAL APPLICABILITY

This invention is a method for producing vinyl chloride resin products which has the process of sticking vinyl chloride resin members together which comprises applying a compounding agent for vinyl chloride resins compatible with them to the portion to be stuck of at least one of the above vinyl chloride resin members and then making the portions to be stuck together of the two members in close adhesion with each other. This invention, which uses as an adhesive a compounding agent for vinyl chloride resins compatible with them, is safe and can also produce vinyl chloride resin products capable of being safely used as medical instruments because it is free from the problems caused when an organic solvent is used which are its remaining in vinyl chloride resin products, its dissolution in a solution filled in vinyl chloride resin products and elution of the organic solvent during use of them. Furthermore, this invention which uses no organic solvents produces a good working environment. In addition, the production method of this invention enables two members to be securely stuck together irrespective of their shapes.

What is claimed is:

1. A method for making a medical instrument from vinyl chloride resin comprising forming at least two vinyl chloride resin members and adhering said vinyl chloride resin members together, said adhering of said members together comprising applying to one or both surfaces of portions of said vinyl chloride resin members to be adhered together a liquid lubricant for vinyl chloride resins which is compatible with vinyl chloride resins and dissolves vinyl chloride resins, said liquid lubricant being selected from the group consisting of liquid paraffin, natural paraffin, polyethylene wax, fatty acids, metallic soaps and fatty acid amides and then joining the portions of said vinyl chloride resin members to be adhered together in close adhesion with each other.

2. The method for making a medical instrument from vinyl chloride resin as set forth in claim 1, wherein said vinyl chloride resin members are joined together by pressure and which further comprises a thermal treatment after said joining of said vinyl chloride resin members together by pressure.

3. The method for making a medical instrument from vinyl chloride resin as set forth in claim 2, wherein said thermal treatment process is autoclave sterilization.

4. The method for making a medical instrument from vinyl chloride resin as set forth in claim 1, wherein said liquid lubricant is selected from the group consisting of stearic acid, zinc stearate, barium stearate, stearic acid amide, palmitic acid amide, methylenebis stearylamide and ethylenebis stearylamide.

5. The method for making a medical instrument from vinyl chloride resin as set forth in claim 1, wherein said liquid lubricant is selected from the group consisting of a liquid paraffin and zinc stearate.

6. The method for making a medical instrument from vinyl chloride resin as set forth in claim 1, wherein said close adhesion is achieved by joining said portions of said vinyl chloride resin members by external pressure.

7. The method for making a medical instrument from vinyl chloride resin as set forth in claim 1, wherein said close adhesion is achieved by joining said portions of said vinyl chloride resin members by fitting one of the members into the other member by force.

8. The method for making a medical instrument from vinyl chloride resin as set forth in claim 3, wherein the autoclave sterilization is carried out at a temperature of about 118° to 120° C.

9. The method for making a medical instrument from vinyl chloride resin as set forth in claim 1, wherein the medical instrument is a blood bag, an infusion solution bag, a catheter, a tube for a blood administration set, a tube for a solution administration set, a tube for a winged infusion set, a tube for a dialyzer or a tube for a blood oxygenator.

* * * * *